(12) United States Patent
Hall (10) Patent No.: US 7,390,008 B1
(45) Date of Patent: Jun. 24, 2008

(54) TRAILER COUPLER

(76) Inventor: Barry Hall, 101 US Hwy. 277, Cement, OK (US) 73017

(*) Notice: Subject to any disclaimer, the term of this patent is extended or adjusted under 35 U.S.C. 154(b) by 188 days.

(21) Appl. No.: 11/059,909

(22) Filed: Feb. 17, 2005

Related U.S. Application Data (63) Continuation-in-part of application No. 10/424,268, filed on Apr. 28, 2003, now abandoned, which is a continuation-in-part of application No. 09/898,220, filed on Jul. 3, 2001, now Pat. No. 6,588,790.

(60) Provisional application No. 60/216,057, filed on Jul. 5, 2000.

(51) Int. Cl.
*B60D 1/06* (2006.01)

(52) U.S. Cl. .................. 280/511; 280/507; 280/513

(58) Field of Classification Search .............. 280/511, 280/507, 513, 477
See application file for complete search history.

(56) References Cited

U.S. PATENT DOCUMENTS

| | | | | |
|---|---|---|---|---|
| 2,523,500 A | * | 9/1950 | Davey et al. ............ | 280/513 |
| 2,590,201 A | * | 3/1952 | Adolph ................. | 280/513 |
| 3,061,334 A | * | 10/1962 | Everett et al. .......... | 280/513 |
| 3,514,980 A | * | 6/1970 | Doyle .................. | 70/258 |
| 4,903,978 A | * | 2/1990 | Schrum, III ............ | 280/477 |
| 5,037,123 A | * | 8/1991 | Smith .................. | 280/508 |
| 5,159,312 A | * | 10/1992 | Engle .................. | 340/431 |
| 5,357,438 A | * | 10/1994 | Davidian ............... | 701/301 |
| 5,421,600 A | * | 6/1995 | Jones et al. ........... | 280/428 |
| 5,434,552 A | * | 7/1995 | Ems .................... | 340/431 |
| 5,482,309 A | * | 1/1996 | Hollis ................. | 280/423.1 |
| 5,558,350 A | * | 9/1996 | Kimbrough et al. ....... | 280/426 |
| 6,222,443 B1 | * | 4/2001 | Beeson et al. .......... | 340/431 |
| 6,756,892 B2 | * | 6/2004 | Konchin et al. ......... | 340/447 |

FOREIGN PATENT DOCUMENTS

| EP | 320202 A2 | * | 6/1989 |
|---|---|---|---|
| FR | 1416339 | * | 9/1965 |
| WO | WO 9429132 A1 | * | 12/1994 |

* cited by examiner

*Primary Examiner*—Lesley D. Morris
*Assistant Examiner*—Maurice Williams
(74) *Attorney, Agent, or Firm*—Martin G. Ozinga; Phillips McFall McCaffrey McVay & Murrah, P.C.

(57) ABSTRACT

A new and improved trailer coupler for connecting a trailer to a ball hitch mounted on a towing vehicle comprising a housing having a recessed socket, a retractable latching plate, a locking mechanism, an access port, a visual indicator, and an alarm system for indicating coupling and decoupling.

4 Claims, 7 Drawing Sheets

TRAILER COUPLER

CROSS-REFERENCE TO RELATED APPLICATIONS

The present application is a continuation-in-part of U.S. Ser. No. 10/424,268, filed Apr. 28, 2003, now abandoned, which is a continuation-in-part of U.S. Ser. No. 09/898,220, filed Jul. 3, 2001, now U.S. Pat. No. 6,588,790, issued Jul. 8, 2003, which claims priority to U.S. Provisional Ser. No. 60/216,057, filed Jul. 5, 2000. Each of the applications listed above is hereby expressly incorporated herein by reference in their entirety.

BACKGROUND OF THE INVENTION

1. Field of the Invention

The present invention relates generally to trailer couplers. More particularly, the present invention is a new and improved trailer coupler that automatically locks in place when attached, provides for a visual inspection that coupler is locked into position, can be remotely unlocked for release, universally accepts all diameter ball hitches, and provides an electronic sensor for determining engagement status.

2. Description of the Known Prior Art

Many coupling devices have been developed for providing a connection between a towing vehicle and a trailer. Typically, a spherical ball is mated to a socket receiver in a male-female style trailer hitch. A popular variety uses a long, vertical sheathing attached to a female portion of the coupler, often referred to as gooseneck or neckover couplers. These types of couplers are often mated to a ball hitch mounted to a vehicle, such as pick-up trucks, in the middle of the vehicle's bed as opposed to a ball hitch generally located on the end of the vehicle near or on the rear bumper.

In operation, a trailer with a gooseneck attachment is positioned over the ball mounted in the bed of the vehicle and then lowered onto the ball. The socket receiver should, generally, have a slightly larger diameter than the ball so that the receiver fully engages or mates with the ball. Generally, once the trailer is mated to the vehicle, a separate manual operation must be performed to insure that the ball is locked into the receiving socket so that the receiver is no longer free to disengage from the ball.

In the prior art, when a ball is mounted in the middle of the bed of a pickup, the operator must get into the back of the vehicle to perform the manual operation of locking the coupler. Due to the configuration of most towing vehicles, this requires the operator to climb over the side of the bed or attempt to climb up the back gated portion where the trailer is now positioned. This practice leads to potential for an injury to the operator. Furthermore, when the operator desires to remove the trailer from the towing vehicle, the operator must once again climb into the bed of the vehicle to unlock the coupler for disengagement.

Also, it is not uncommon in the prior art for the operator, who has lowered the receiver onto the ball, to believe that the coupler is locked in when the opposite is true. Unfortunately, this leads to potentially dangerous situations where the trailer disengages while being towed.

Some of these shortcomings in the prior art also similarly apply to conventional trailer hitches mounted on the rear of a vehicle without a gooseneck assembly. Furthermore, in the prior art standard trailer hitches that use a mating system of a ball attached to the rear of a vehicle such as behind or on the rear bumper often require the locking mechanism to also act as a supporting function and sometimes even a pulling function. These configurations may be extremely difficult to operate and require substantial effort to lock or unlock.

Furthermore, many of these prior art hitches may be placed in a latched configuration but a separate manual operation is required to lock the device in the latched configuration. If a person fails to take the extra step of locking the device, then a potentially dangerous situation may exist.

Still further, theft is a common concern for individuals who use trailers due to the very nature of the easily transportable devices and cost thereof. It is a common consideration of trailer users, that even though the towing vehicle may have anti-theft systems, that there is no readily available means to determine if the trailer has been disconnected in an attempted theft. What is needed is an alarm or notification system that provides a user or owner of the trailer when an undesired decoupling has occurred through theft, accident or otherwise. Likewise, it is also desirable to know if a trailer that is not hooked to a towing vehicle is coupled to an unauthorized vehicle.

Thus, there is a need for a self locking trailer coupler which provides for an automatic locking, a visual indicator that the coupler is locked in position, a remote release for unlocking said coupler, and a coupler that may universally accept multiple diameter ball hitches.

SUMMARY OF THE INVENTION

In general, the present invention is a new and improved trailer coupler which is spring loaded so that, when the ball slides into the receiver socket, it is locked into position with a visual indicator that the receiver is locked onto the ball. The present invention also provides a means to remotely unlock the receiver from the ball.

In another preferred embodiment, the present invention may include a sensor and alarm system that notifies an owner or user of an undesirable decoupling of the trailer from the towing vehicle via a sensor system that electronically monitors when a ball has left or entered a hitch socket.

In this respect, before explaining at least one embodiment of the invention in detail, it is to be understood that the invention is not limited in this application to the details of construction and to the arrangement so the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore that the claims be regarded as including such equivalent constructions insofar as they do not depart from the spirit and scope of the present invention.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved trailer coupler which automatically locks in place on the receiver when the coupler is lowered on the receiver.

It is a further object of the present invention to provide a new and improved trailer coupler which may be easily and efficiently manufactured and marketed.

An even further object of the present invention is to provide a new and improved trailer coupler which is of a more durable and reliable construction than that of the existing known art.

Still another object to the present invention to provide a new and improved trailer coupler which is susceptible of a low cost of manufacture with regard to both materials and labor, which accordingly is then susceptible of low prices of sale to the consuming public, thereby making such economically available to the buying public.

Another object of the present invention is to provide a new and improved trailer coupler which provides some of the advantages of the prior art, while simultaneously overcoming some of the disadvantages normally associated therewith.

Yet another object of the present invention to provide a new and improved trailer coupler which is remotely actuated to release the coupler off the receiver without the need of the operator to physically access the coupler.

Still yet another object of the present invention is to provide a new and improved trailer coupler with a locking mechanism which may work on gooseneck couplers as well as standard ball hitches attached to the rear of a vehicle.

A further object of the present invention is to provide a new and improved trailer coupler which uses a mechanical advantage of spring loading and multiple plates for latching and locking hitches in place.

And yet another object of the present invention is to provide a new and improved trailer coupler that universally accepts multiple sized ball hitches, such as but not limited to 2 inch, 1⅞ inch, and 50 millimeter diameters.

Still furthermore, an object of the present invention is to provide a new and improved trailer coupler that may also include operation instruction located on the housing of the coupler in a permanent fashion so that users have a readily available means for information regarding the coupler.

Yet another object of the present invention is to provide a new and improved trailer coupler that electronically senses the entering of a ball from a towing vehicle to the socket from the trailer hitch or likewise senses the removal thereof.

Still another object of the present invention is to provide a new and improved trailer coupler that alerts the user or owner of an undesirable coupling of the trailer or undesirable decoupling of the trailer.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference would be had to the accompanying drawings and descriptive matter in which there is illustrated preferred embodiments of the invention.

DETAILED DESCRIPTION OF THE PREFERRED EMBODIMENTS

Figure 1:
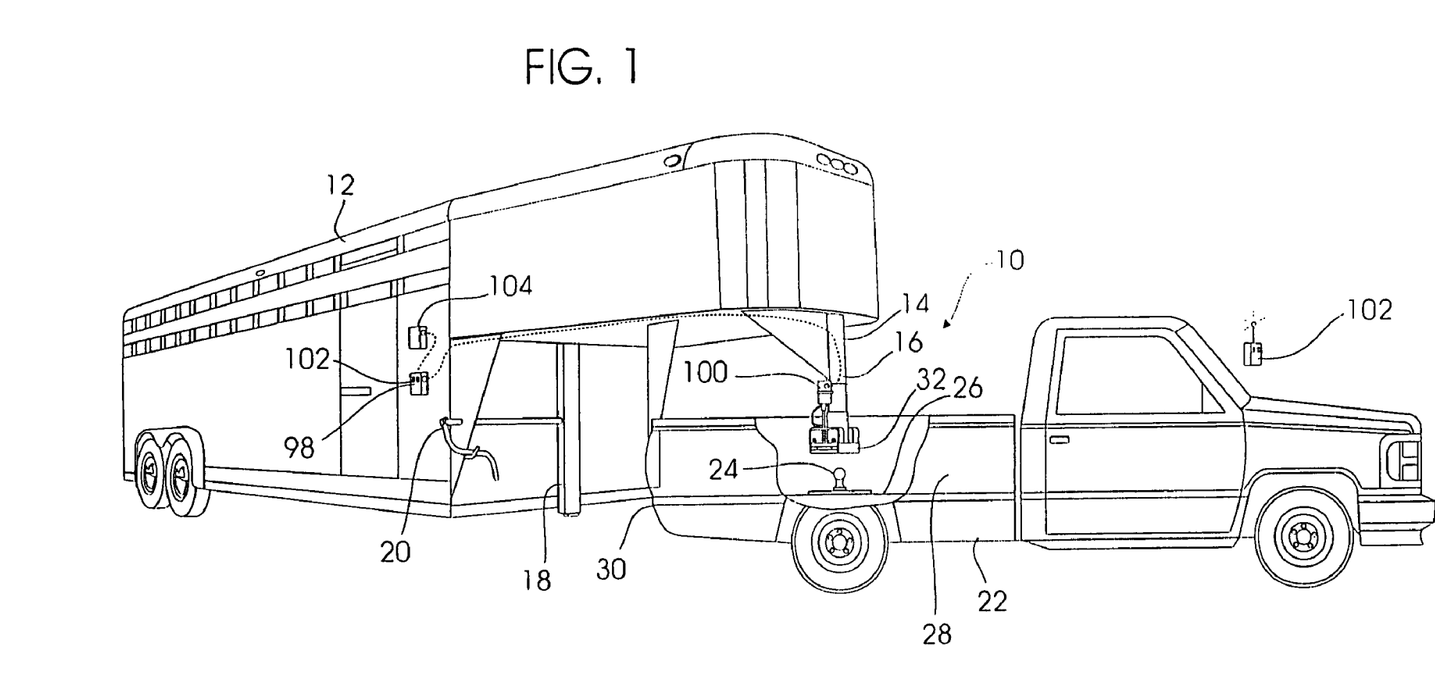
FIG. 1 is a perspective view of a preferred embodiment of the invention with a partial cut away of the bed of a towing vehicle.

Referring now to the drawings, wherein like reference numerals designate corresponding structure throughout the views, and referring in particular to FIG. 1, reference numeral 10 designates a preferred embodiment of a new and improved trailer coupler system in accordance with the current invention. Coupler system 10 is generally adapted to be used with conventional trailers 12 including fifth wheelers. A preferred embodiment is for trailers 12 of the type including a gooseneck 14, possessing a generally substantially vertical extending column 16, and a generally vertically axially reciprocal jack 18 actuated by a manual hand crank 20 to selectively support the gooseneck 14 when the trailer is not engaged to a towing vehicle 22. Towing vehicle 22 can be but is not limited to a pick-up truck. As in conventional trailer hitches of this type a standard substantially spherical trailer ball hitch 24 is mounted in an upstanding manner through a floor 26 of a cargo bed 28 of the towing vehicle 22.

It is further contemplated that coupler system 10 may also be used on trailers 12 without the gooseneck 14 that generally attach to rear 30 of the towing vehicle 22 with mounted ball hitch 24. It is also further contemplated that coupler system 10 could be retrofitted to existing trailers 12 as well as installed during the manufacture of trailer 12.

Figures 2, 2A:
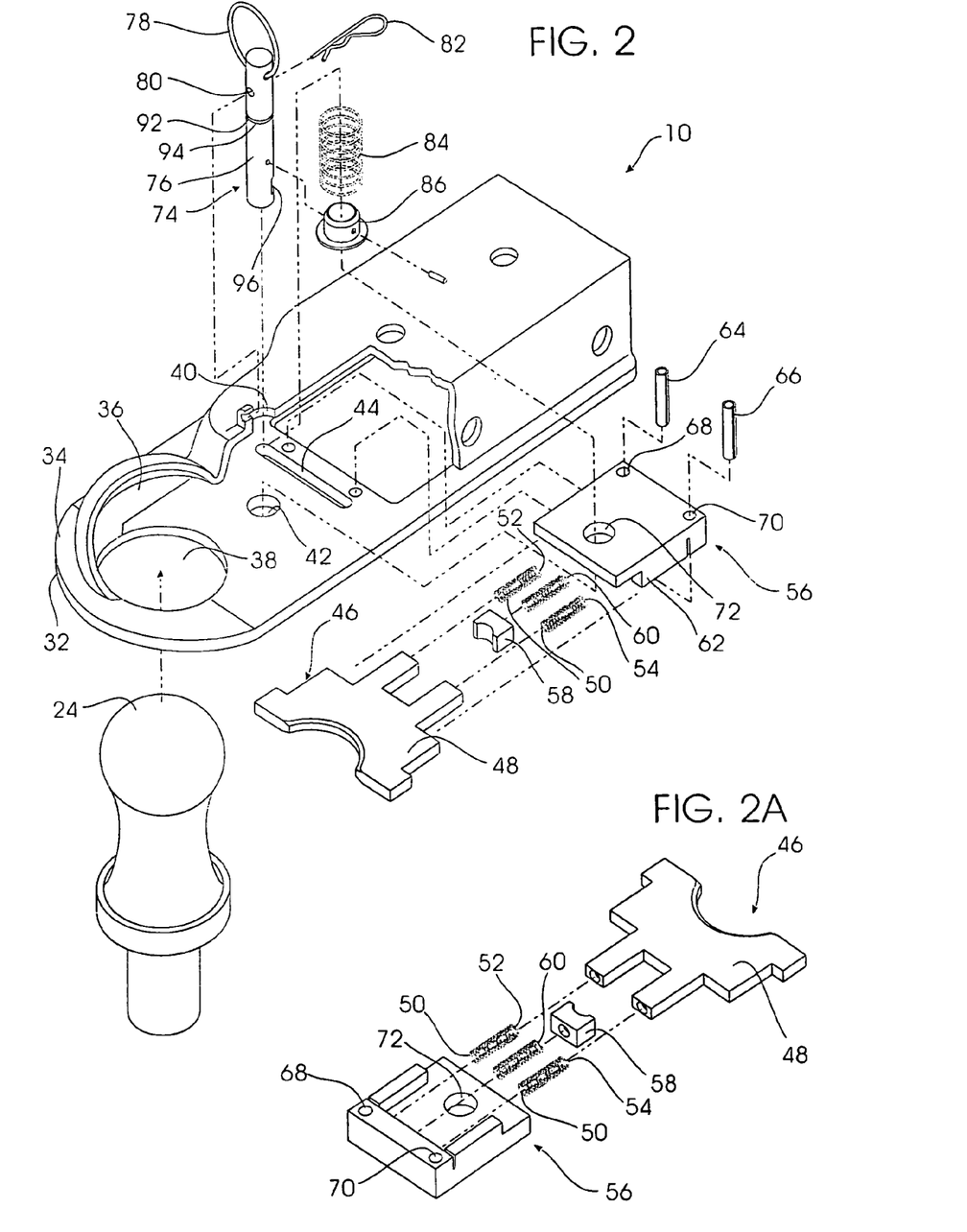
FIG. 2 is an exploded perspective view with a partial cutaway showing a preferred embodiment of the invention.
FIG. 2A is a perspective view of a preferred embodiment of the invention showing the reverse side of a preferred embodiment of elements in FIG. 2.

Referring to the drawings and FIGS. 2 and 2A in particular, coupler system 10 generally comprises a trailer coupler 32 generally comprising a housing 34 having a recessed socket 36 with a downwardly directed socket opening 38 for receiving ball hitch 24. Housing 34 generally includes top aperture 40, bottom aperture 42, and clean out access port 44 which will be discussed in greater detail below. Housing 34 may be attached to the gooseneck 14 by welding, bolting, or the like. Housing 34 may also be incorporated into trailer 12 or attached to trailer 12 without a gooseneck 14 such as but not limited to trailers 12 that attach to the rear 30 of the towing vehicle 22. Housing 34 may also include embossed, engraved or otherwise affixed instructions (not depicted), for operation of invention 10. A preferred construction would allow for housing 34 to have a generally flat portion wherein instructions could be placed so that an operator or user could see and read the instructions while observing the operation thereof.

Coupler system 10 further includes an automatic locking means 46 which generally includes a retractable latching plate 48 in communication with a spring assembly 50. Plate 48 is spring biased such that plate 48 generally cooperates with socket 36 to couple or trap ball hitch 24 in socket 36 which will be discussed below in greater detail. Spring assembly 50 may generally include two springs 52 and 54, but may be constructed with one or more. Spring assembly 50 should allow for ball hitch 24 to pass and exit socket 36 when trailer 12 is lowered or raised such that springs 52 and 54 compress as ball hitch 24 passes. The force of ball hitch 24 pushes or retracts plate 48 and thereby compresses spring assembly 50 such that after the width of ball hitch 24 passes, spring assembly 50 pushes out such that plate 48 cooperates with socket 36 to hold ball hitch 24 in socket 36.

Automatic locking means 46 further includes locking mechanism 56 which generally includes tab 58 with spring 60 which may be positioned in member 62 along with spring assembly 50 and portion of latch plate 48. Member 62 may be removably attached to housing 34 by conventional means such as but not limited to pins 64 and 66 through apertures 68 and 70. Member 62 may further include aperture 72 which will be discussed in greater detail below.

Automatic locking means 46 may further include pin assembly 74 with pin 76 pull handle 78, aperture 80 for placing a safety pin 82 which will also be discussed in greater detail below, spring assembly 84 which that biases pin 76 in a downward direction and further generally includes a retention positioning piece 86. Pin 76 is generally positioned in housing 34 top aperture 40 and member 62 aperture 72.

Figures 3, 3A:
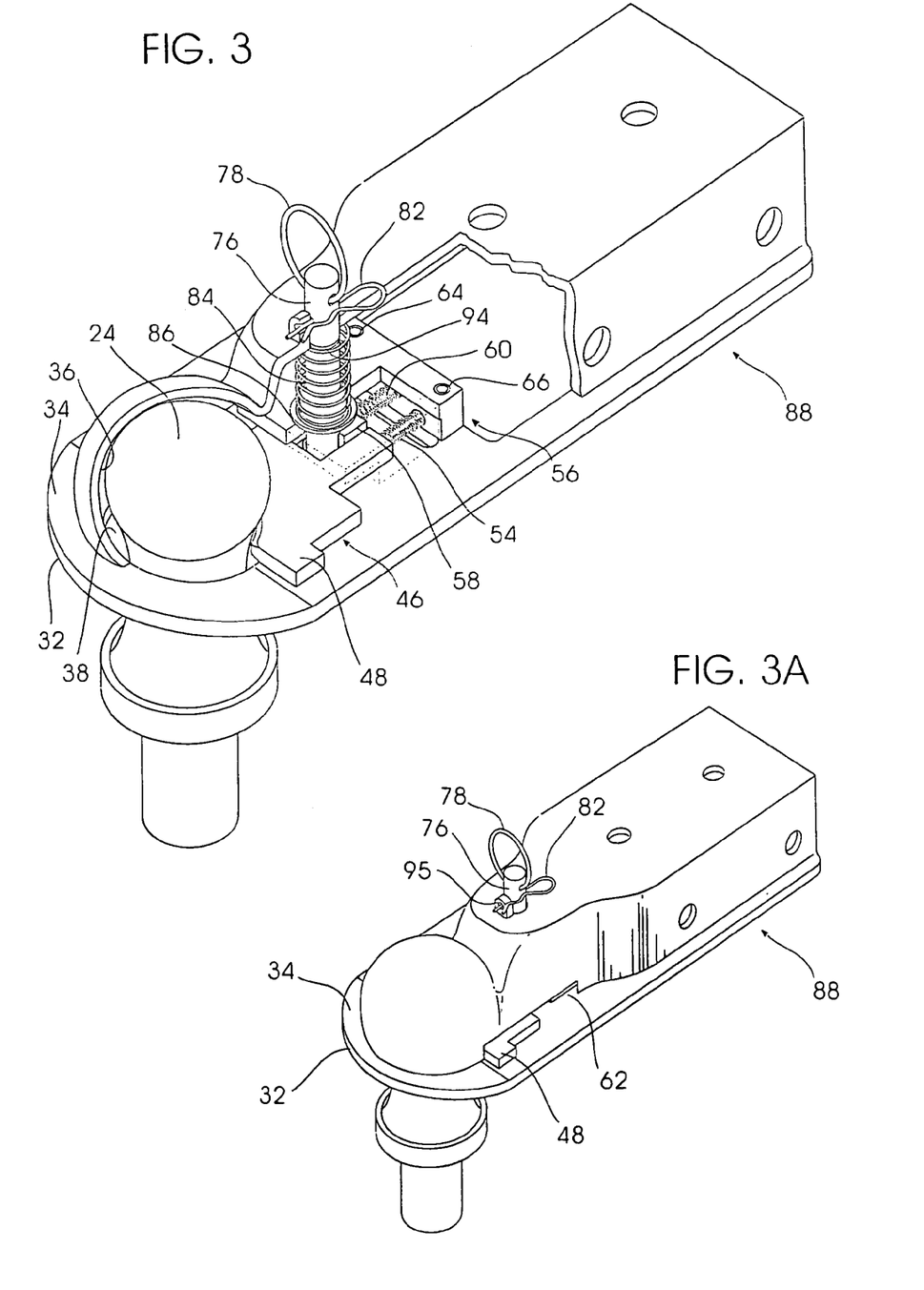
FIG. 3 is a perspective view of a preferred embodiment of the invention in a locked configuration with a partial cutaway.
FIG. 3A is a perspective view of a preferred embodiment of the invention in a locked configuration.

Referring to the drawings and FIGS. 3 and 3A in particular, locked configuration 88 generally refers to pin 76 passing through or entering housing 34 bottom aperture 42 such that plate 48 may not retract by limiting plate 48 travel direction and thus trapping ball hitch 24 in socket 36.

Figures 4, 4A:
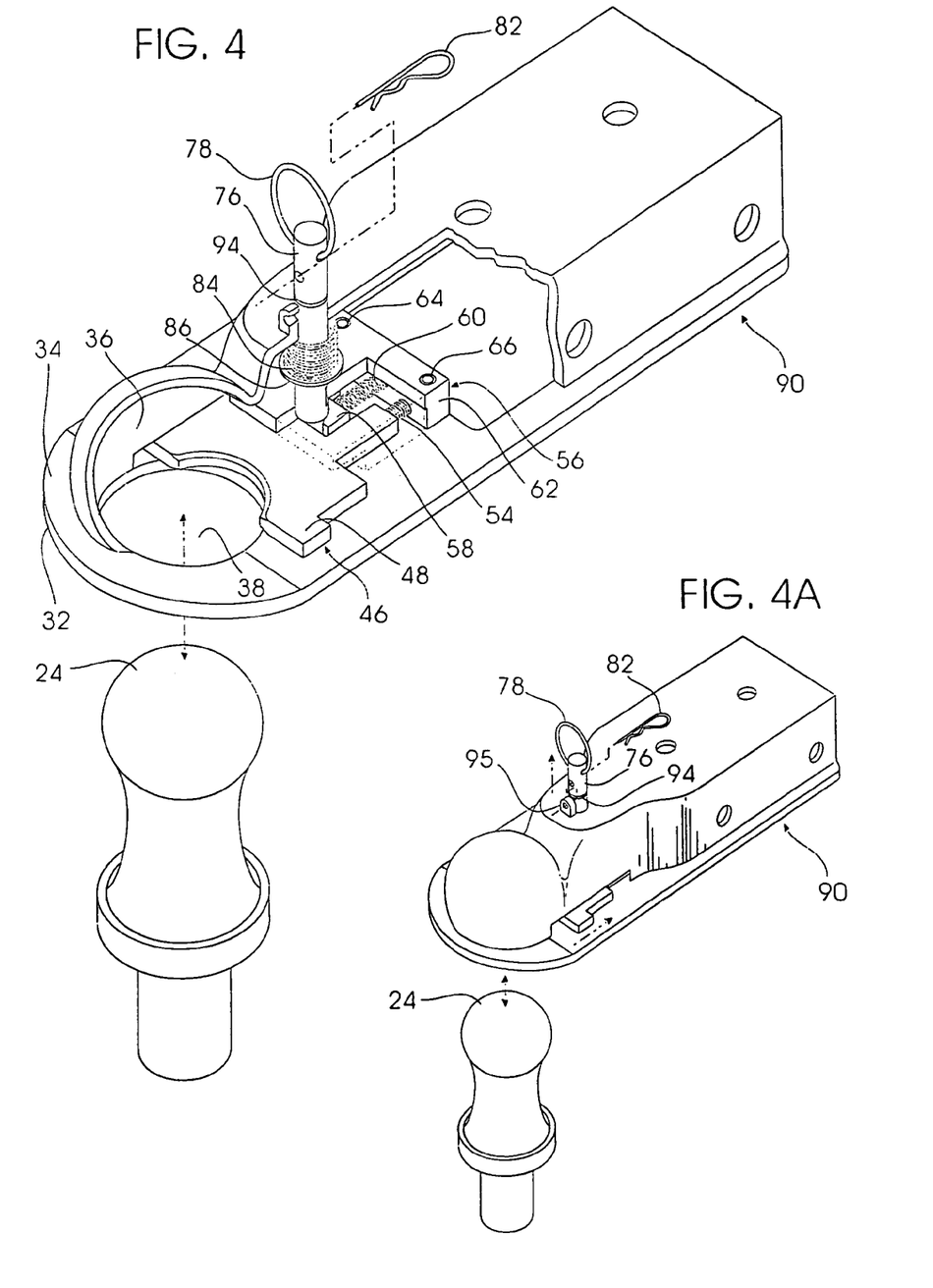
FIG. 4 is a perspective view of a preferred embodiment of the invention in an unlocked configuration with a partial cutaway.
FIG. 4A is a perspective view of a preferred embodiment of the invention in an unlocked configuration.

Again referring to then drawings and FIGS. 4 and 4A specifically, unlocked configuration 90 generally refers to pin 76 in an upward position such that pin 76 is blocked from entering housing aperture 42 by tab 58 thus allowing plate 48 to move freely back and retract. In the unlocked configuration 90, pin 76 may not enter housing 34 bottom aperture 42 while tab 58 blocks the passageway of pin 76. In FIGS. 4 and 4A, plate 48 is generally shown in a retracted position for purposes of illustration although the ball hitch 24 is not entered into socket 36.

It is further contemplated that plate 48 may include a portion for an operator to manipulate the plate 48 by hand. It is contemplated that invention 10 may be constructed without any springs or spring assembly wherein an operator or user could physically manipulate the locking mechanism 56 by hand and that tab 48 may be construed as a handle for manual operation.

Pin assembly 74 may further include a visual indicator 92 which may be color coded, such as but not limited to green, for a visual confirmation that the coupler 32 is in locked configuration 88. Pin 76 may further include groove or grooves 94 which may be colored coded in the recessed area of groove 94 so that the color will not be scraped off as pin 76 travels from the locked configuration 88 to the unlocked configuration 90.

Furthermore, housing 34 may further include safety pin 82 receiver 95 such that as the coupler 32 is in the locked configuration 88, safety pin 82 may thread through pin 76 and housing 34 so that pin 76 is trapped in a locked configuration 88. Pin 76 may also further include indenture 96 for adding further structural integrity when pin 76 is in the locked configuration 88. Coupler 32 is preferably constructed from metal or other durable material capable of handling associated forces with towing trailer 12.

Another preferred embodiment includes clean out access port 44 in housing 34 which allows dirt, grit, water and other foreign debris to be drained, blown out or removed from locking mechanism 56 member 62. Still another preferred embodiment adds a theft deterrent assembly (not depicted) wherein a separate lock may be added such as but not limited to threading a bolt of a lock through pin 76 and into to receiver 95. Other such theft deterrent assemblies may include locking pins or travel restrictor which prevent pin 76 from disengaging housing 34 bottom aperture 42.

Once again referring to FIG. 1, still another preferred embodiment of coupler system 10, coupler 32 is in communication with remote control assembly 98 for moving pin 76 from a downward locked configuration 88 to an upward unlocked configuration 90. Remote control assembly 98 generally includes a motor 100 or other device such as but not limited to an air cylinder, solenoid or vacuum cylinder which mechanically lifts pin 76. A remote control activator 102 is in communication with motor 100 and may be positioned on trailer 12 or towing vehicle 22. Communication may be hard wired or wireless. Power source 104 for motor 100 may be wired from towing vehicle 22 or attached to trailer 12 and may be a car battery or other such conventional battery.

Figure 5:
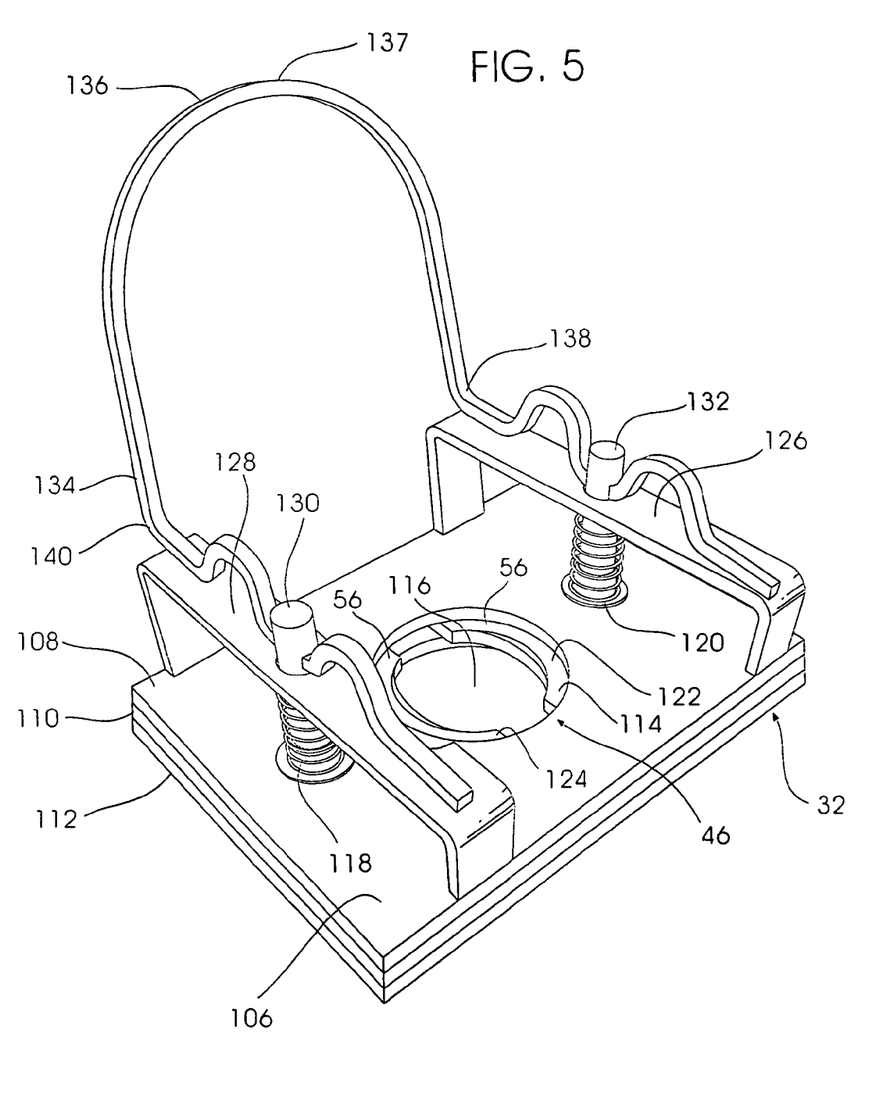
FIG. 5 is a perspective view of a preferred embodiment of the invention.

Once again referring to the drawings and FIG. 5 in particular, in another preferred embodiment not fully depicted, coupler 32 generally comprises a dual pin construction 106 with a top plate 108, a middle plate assembly 110, a bottom plate 112, and a locking mechanism 114.

Top plate 108 is generally planar with a preferred embodiment of a rectangular shape but not limited to such. A preferred embodiment of top plate 108 has multiple apertures. In the center of top plate is aperture 116 for engaging ball hitch 24. Aperture 118 is generally located between first corner and second corner and aperture 120 is likewise generally located between third corner and fourth corner. Apertures 118 and 120 are provided for a preferred embodiment of locking mechanism 114.

Top plate 108 is generally attached to the gooseneck 14 at attachment point where receiver ball cap is provided to form the socket 36. Ball cap may be attached to top plate 108 or attached to interior of gooseneck 14. Ball cap generally carries the weight of the trailer 12 and is positioned to fit firmly onto ball hitch 24.

The middle plate assembly 110 generally comprises two locking mechanisms 56 such that as previously described above in a preferred embodiment. Plates 122 and 124 generally perform the same function as plate 48 but work in conjunction to trap ball hitch 24 from two opposing points.

A preferred embodiment of locking mechanism 114 generally comprises a first bracket 126, a second bracket 128, a first spring loaded locking pin 130, a second spring loaded locking pin 132, and a release assembly 134. Locking mechanism 114 first bracket 126 and second bracket 128 each generally comprise a "U" shape attached to top plate 108 such as but not limited to by welding. First bracket 126 and second bracket 128 generally include apertures.

Release assembly 134 generally comprises a manual release lever 136 with a preferred embodiment attached to first spring loaded locking pin 130 and second spring loaded locking pin 132. Release lever 136 extracts the locking pins 130 and 132 from engaging the bottom plate 112 by pulling locking pins 130 and 132 generally upward which in turn moves locking pins 130 and 132 into the unlocked position. In a preferred embodiment, release lever 136 generally has a handle portion 137, a first rocking point 138 generally resting on or near first bracket 126 and a second rocking point 140 generally resting on or near on second bracket 128. Rocking points 138 and 140 provide leverage when handle portion 137 is depressed. Manual release lever 136 generally attaches with first spring loaded locking pin 130 at a pivot and attaches with second spring loaded locking pin 132 at a pivot.

Figures 6, 6A:
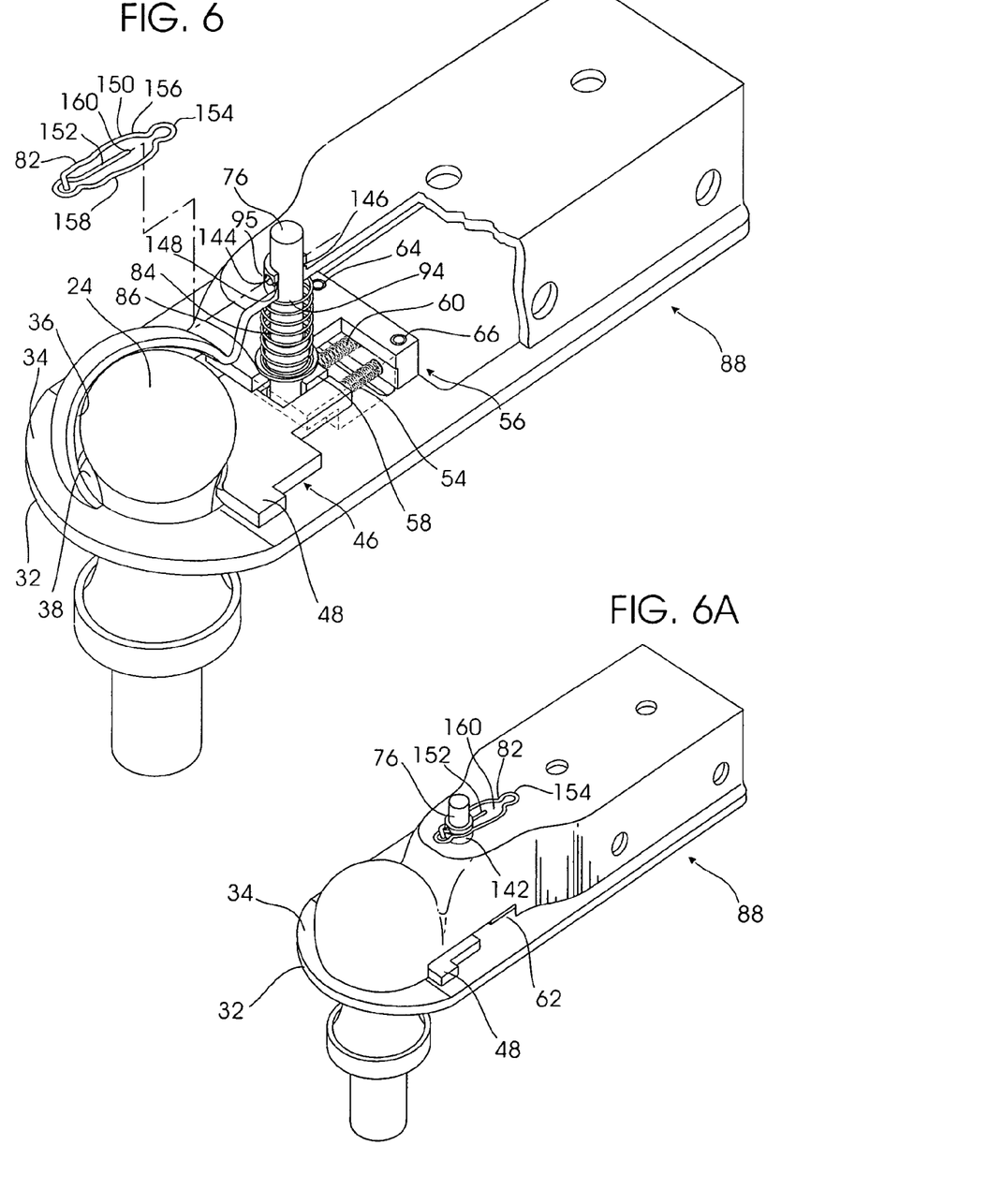
FIG. 6 is a perspective view of a preferred embodiment of the invention in a locked configuration with a partial cutaway generally depicting another embodiment of a safety pin that is not attached.
FIG. 6A is a perspective view of the preferred embodiment of the invention in a locked configuration as generally depicting another embodiment of a safety pin in an attached position.

Referring now to FIGS. 6 and 6A, in another preferred embodiment, housing 34 safety pin 82 receiver 95 may be of a configuration cylindrical construction that generally forms a full sleeve 142 around the diameter of pin 76. Sleeve 142 may further include a first aperture 144 and a second aperture 146 which are generally aligned to accept safety pin 82. Furthermore, sleeve 142 may further include an indention 148 that generally circumscribes the outer diameter of sleeve 142 which will be discussed in greater detail below.

In a preferred construction, safety pin 82 may further include a retention means 150. It is contemplated that safety pin 82 may be constructed such that it generally communicates, connects, or removably attaches to sleeve 142 whether or not the safety pin 82 is threaded through sleeve 142 aperture 144, pin 76, and/or sleeve 142 second aperture 146. It is contemplated that retention means 150 will generally and relatively secure safety pin 82 when not in use to housing 34 in a readily usable manner wherein the safety pin 82 may quickly be inserted into the aforementioned for securing pin 76 in locked configuration 88.

Safety pin 82 having a retention means 150 may be of a one piece construction wherein a wire is bent into forming a shape having a generally straight segment 152 for threading through housing 34 and pin 76, a spring clip segment 154, and a fist side segment 156, a second side segment 158 and an aperture 160. It is contemplated that first side segment 156 and second side segment 158 generally lay, connect, or communicate with sleeve 142 indention 148 for generally keeping straight segment 152 in line for threading or placement and preventing safety pin 82 from slipping off housing 34 when safety pin is not engaged.

Spring clip segment 154 generally provides a bias keeping first side segment 156 and second side segment 158 held in indention 148 but still allow a user to push or pull the safety pin 82 in and out of position. Furthermore, aperture 160 should be large enough in diameter to allow pin 76 to rest inside the retention means 150 when straight segment 158 is not actively threaded or otherwise engaging pin 76. It is understood that retention means 150 may be of other shapes or forms not depicted in the illustrations and that a preferred construction is generally depicted.

It is further understood that invention 10 configuration allows for acceptance of different ball hitches 24, such as but not limited to 2 inch, 1⅞ inch and 50 millimeter. It is contemplated that invention 10 may therefore be used as a universal coupler for multiple types of ball hitches 24 where the prior art fails. In a preferred embodiment, housing 34 recessed socket 36 and socket opening 38 are large enough to accommodate and cooperate with locking mechanism 56 to receive at least a 2 inch ball hitch 24 or greater. Likewise, it is understood that housing 34 recessed socket 36 and socket opening 38 may accommodate and cooperate with locking mechanism 56 to receive at least as small as 1⅕ inch ball. Therefore it is contemplated that invention 10 may be of a construction specific for a certain range of ball hitches 24 or a specific size if desired.

Figure 7:
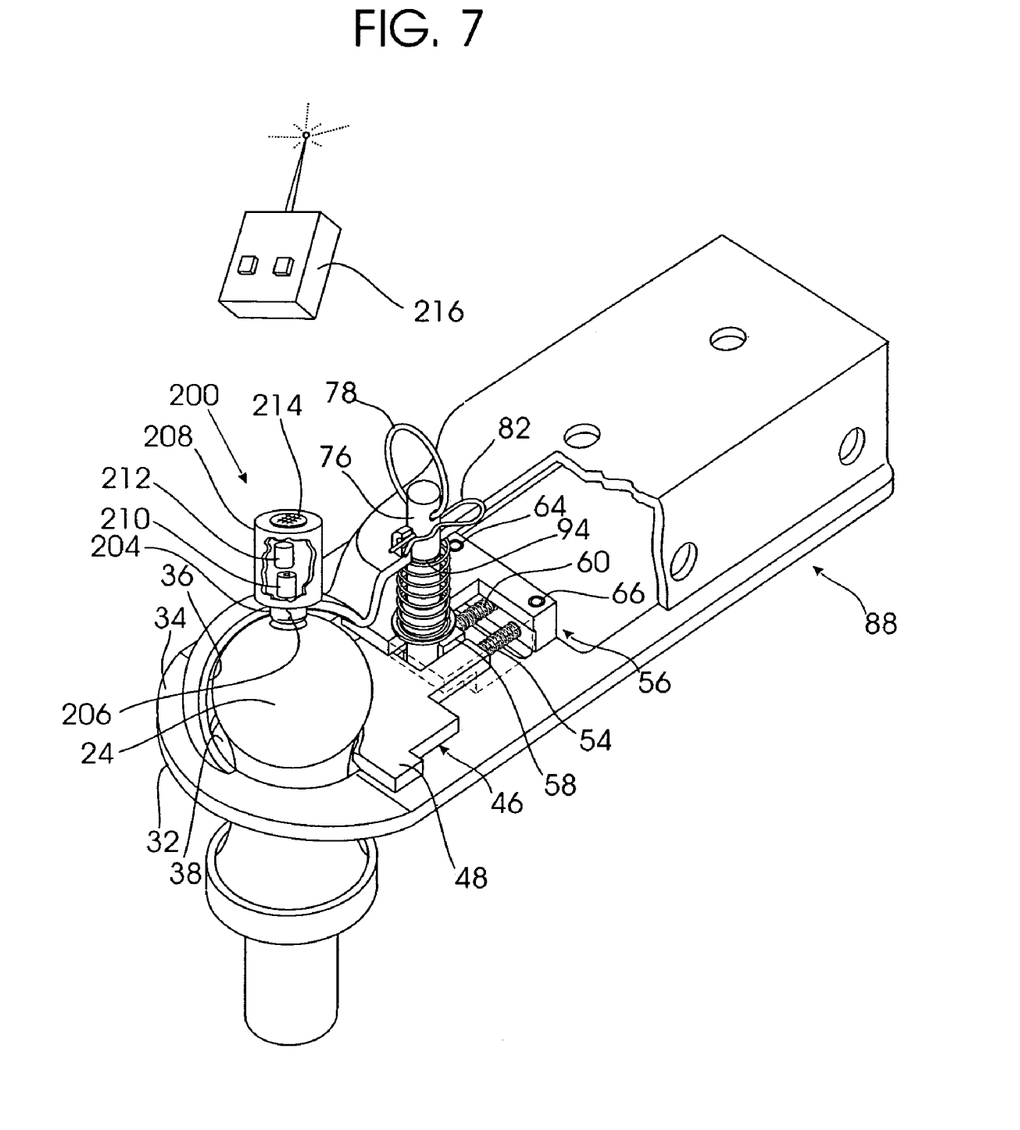
FIG. 7 is a perspective view of a preferred embodiment of the invention in a locked configuration with a partial cutaway.

In another preferred embodiment, an alarm system 200 may be included. Alarm system 200 may be attached to housing 34 wherein a sensor 202 is generally located inside socket 36 for detecting when ball hitch 24 either enters or exits recessed socket 36 and signaling an alert. In a preferred embodiment socket 36 may further include aperture 204 for generally locating sensor 202 such as but not limited to a contact, pressure, magnetic, electronic, and so forth known in the art. Alarm system 200 may include sensor 202 which runs wires 206 through aperture 204 to housing 208. Housing 208 may include an internal power source 210 such as a battery or be connected to an external power source, such as power source 104. Housing 208 may further include a transmitter 212 for signaling an alert. Housing 208 may include an audible alert device 214 or means such as a speaker or other commonly known electronic audible alerts means known in the art.

It is contemplated that alarm system 200 may be attached inside housing 34, or generally located on other portions in secured or non-secured areas of trailer 12 wherein sensor 202 is still generally located in socket 36 wired via wires 206 to another placement of housing 208. Like wise, it is contemplated that alarm system 200 may be generally utilized in numerous configuration of trailers and hitches such as but not limited to pull type, gooseneck, eighteen wheeler, king pin configurations and so forth.

In accordance with a preferred embodiment of the invention, transmitter 212 may transmit to a remote unit 216 an alert when an undesired uncoupling or coupling is occurring. In a preferred construction remote unit 216 may be attachable to a key chain or remote control activator 102. It is further understood that alarm system 200 may include means for selecting a decibel range of the audible alert. By example, a relatively loud signal may be utilized in a "theft" mode or a relatively quiet signal may be used for indicating when a desired coupling or uncoupling has occurred to let the user know the status of the hitching process.

It is understood that, in general, alarm systems and the electronics associated with them are well known. Also, it is known to transmit signals, audible signals and so forth. The above is not to be considered limiting the current invention, but an example of a preferred construction of alarm system 200 utilizing sensor 202.

In another preferred embodiment, alarm system 200 may include a tracking means, such as commercially available products like ONSTAR, use G.P.S., wireless phone technology, and so forth. It is contemplated that alarm system 200 will allow a user to track the whereabouts of trailer 12 as well as status of coupling. It is further contemplated that other sensors may be utilized throughout the trailer or towing vehicle to determine if doors, windows and the like have been opened or altered. It is still further contemplated that these events may be transmitted to a remote unit 216.

In Operation

As trailer 12 is desirably positioned behind towing vehicle 22, coupler 32 is aligned over receiver ball hitch 24 positioned on the floor 26 in cargo bed 28 of towing vehicle 22 or rear 30 of towing vehicle for non-gooseneck 14 trailers 12. Trailer 12 is generally lowered so that coupler 32 engages receiver ball hitch 24 in socket 36, such as but not limited to lowering trailer 12 by hand crank 20.

As coupler 32, in the unlocked configuration 90, engages ball hitch 24 through socket opening 38, ball hitch 24 pushes or retracts plate 48 by compressing spring assembly 50. After ball hitch 24 passes plate 48, plate 48 spring assembly 50 pushes out such that plate 48 cooperates with socket 36 to hold ball hitch 24 in socket 36.

During the pushing back or retracting of plate 48, tab 58 is also pushed backward freeing pin assembly 74 such that pin 76 drops and is pushed downward by spring assembly 84 such that pin 76 may enter housing 34 bottom aperture 42. In this position, plate 48 is no longer able to freely retract.

To reset coupler 32 back to an unlocked configuration 90, user manually lifts pin 76 from housing 34 bottom aperture 42 compressing spring assembly 84 of pin assembly 74. As pin 76 moves upward, spring 60 of tab 58 slides across bottom aperture 42 such that pin 76 is resting on tab 58. The locking mechanism 56 is now loaded such that pushing back or retracting plate 48 will then automatically activate and lock when ball hitch 24 enters socket 36.

The lifting of pin 76 may also be remotely accomplished by remote control assembly 98 such that user activates remote control activator 102 which communicates to motor 100 to retract pin 76.

Whereas, the present invention has been described in relation to the drawings attached hereto, it should be understood that other and further modifications, apart from those shown or suggested herein, may be made within the spirit and scope of this invention.

I claim:

1. A new and improved trailer coupler for connecting a trailer to a ball hitch mounted on a towing vehicle comprising:
   (a) a housing having a recessed socket with a downwardly directed socket opening for receiving said ball hitch, an interior cavity in communication with said recessed socket, a top, a bottom, a top aperture on said top of said housing, a bottom aperture on said bottom of said housing, a passageway through said housing aligned between said top aperture and said bottom aperture;
   (b) a retractable latching plate generally disposed in said housing interior cavity and said recessed socket and having a spring assembly wherein said plate may retract when said spring assembly is compressed for allowing said ball hitch to enter and exit said recessed socket and wherein said plate may further cooperate with said recessed socket such that said ball hitch is trapped in said recessed socket;
   (c) a locking mechanism disposed in said interior cavity and having a spring loaded pin with a first portion and a second portion, wherein said pin is aligned in said passageway of said housing such that said pin first portion operatively extends through said top aperture of said housing wherein said locking mechanism automatically cooperates with said plate to provide:
      (1) an unlocked configuration wherein said plate may freely retract when said spring assembly is compressed allowing for said ball hitch to enter and exit said recessed socket, and
      (2) a locked configuration wherein said pin communicates with said plate such that said plate may not retract thereby confining said ball hitch in said recessed socket;
   (d) an access port disposed in said bottom of said housing wherein said access port provides access to said interior cavity of said housing and said retractable latching plate spring assembly;
   (e) a visual indicator disposed on said first portion of said pin for determining if said locking mechanism is in said unlocked configuration or said locked configuration whereby said visual indicator is visible when said locking mechanism is in said locked configuration; and
   (f) an alarm system attached to said housing wherein said alarm system indicates with an audible alert when said ball hitch either enters or exits said recessed socket and wherein said alarm system further includes a transmitter for transmitting to a remote unit said alert.

2. The invention of claim 1 wherein said remote unit is attached to a key chain.

3. The invention of claim 1 wherein said alarm system further includes an internal power source.

4. The invention of claim 1 wherein said audible alert may be of a selectable decibel range.

\* \* \* \* \*